(12) United States Patent
Messina

(10) Patent No.: US 9,279,223 B2
(45) Date of Patent: Mar. 8, 2016

(54) SAND RETENTION SYSTEM

(71) Applicant: Mario L. Messina, Dallas, TX (US)

(72) Inventor: Mario L. Messina, Dallas, TX (US)

( * ) Notice: Subject to any disclaimer, the term of this patent is extended or adjusted under 35 U.S.C. 154(b) by 0 days.

(21) Appl. No.: 14/471,924

(22) Filed: Aug. 28, 2014

(65) Prior Publication Data

US 2015/0078825 A1 Mar. 19, 2015

Related U.S. Application Data

(60) Provisional application No. 61/871,223, filed on Aug. 28, 2013.

(51) Int. Cl.
*E02B 3/04* (2006.01)
*E02B 3/06* (2006.01)

(52) U.S. Cl.
CPC .... *E02B 3/04* (2013.01); *E02B 3/06* (2013.01)

(58) Field of Classification Search
CPC .............. E02B 3/04; E02B 3/046; E02B 3/06
See application file for complete search history.

(56) References Cited

U.S. PATENT DOCUMENTS

| | | | | |
|---|---|---|---|---|
| 954,283 | A * | 4/1910 | Hawkes | 405/21 |
| 4,297,052 | A * | 10/1981 | Rankin | 405/16 |
| 4,312,601 | A * | 1/1982 | Allen | 405/15 |
| 4,439,059 | A * | 3/1984 | Kikuzawa et al. | 405/25 |
| 4,465,399 | A * | 8/1984 | Kikuzawa et al. | 405/32 |
| 4,477,206 | A * | 10/1984 | Papetti et al. | 405/172 |
| 4,690,585 | A * | 9/1987 | Holmberg | 405/19 |
| 4,889,446 | A * | 12/1989 | Holmberg | 405/19 |
| 5,109,796 | A * | 5/1992 | Monus | 119/221 |
| 5,201,136 | A * | 4/1993 | LaMorte et al. | 119/221 |
| 5,405,217 | A * | 4/1995 | Dias et al. | 405/25 |
| 6,382,874 | B1 * | 5/2002 | Hoashi | 405/25 |
| 6,619,884 | B2 * | 9/2003 | Davis et al. | 405/111 |
| 6,746,177 | B1 * | 6/2004 | Hoashi | 405/15 |
| 7,922,421 | B2 * | 4/2011 | McGillick et al. | 405/16 |

FOREIGN PATENT DOCUMENTS

| | | | | | |
|---|---|---|---|---|---|
| JP | 56025509 | A | * | 3/1981 | E02B 3/04 |
| JP | 56119010 | A | * | 9/1981 | E02B 3/14 |
| JP | 02112511 | A | * | 4/1990 | E02B 3/02 |

* cited by examiner

*Primary Examiner* — Frederick L Lagman
(74) *Attorney, Agent, or Firm* — David W. Carstens; Gregory W. Marcum; Carstens and Cahoon, LLP

(57) ABSTRACT

A method of building up and maintaining beach sediment, building and changing beach profiles, and controlling beach erosion that uses a series of varying diameter plastic pipes joined to obtain various lengths, laid parallel and on top of each other and situated perpendicular or at various angles to the shoreline. The pipes act to slow bottom currents and promote sand accretion in and around the pipes thereby stabilizing shoreline profiles and controlling beach erosion. The pipes are held together by cables or in a "cradle" to help stabilize the pipes on the sea bottom. Certain pipes have pre-drilled holes of various diameters through their sidewalls to allow in-flow of sand-carrying water such that the pipes become filled with sand acting to stabilize the pipes. Pipe diameter sizes are selected as necessary to accomplish most efficient sediment accumulation around the pipe structures.

39 Claims, 3 Drawing Sheets

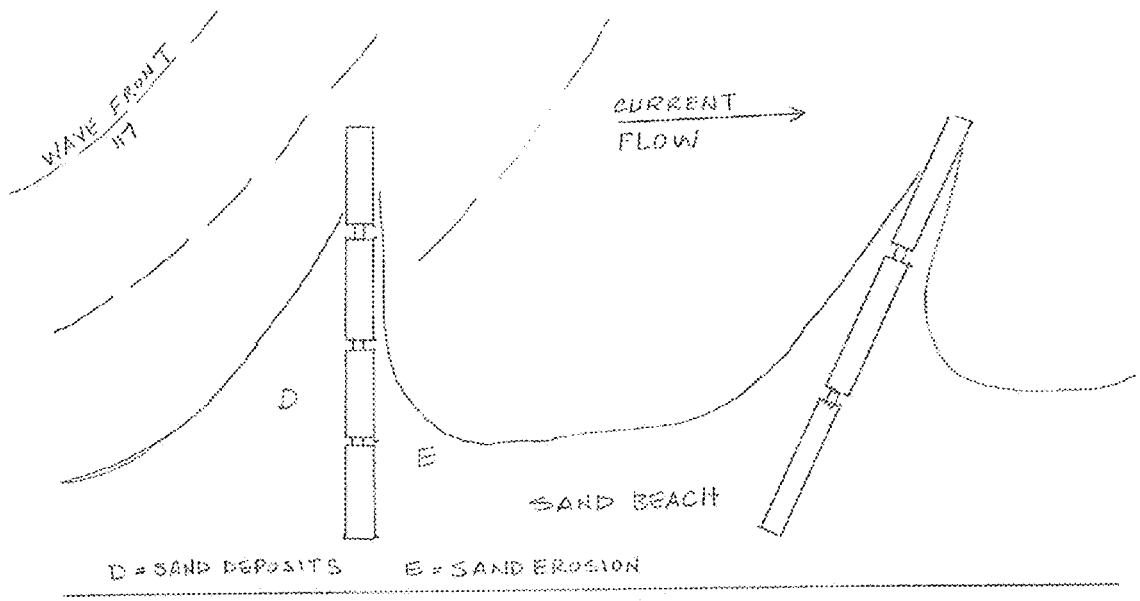
FIG. 1
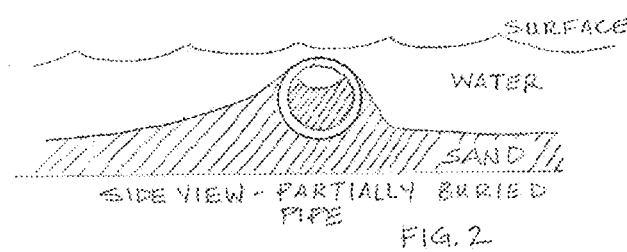
FIG. 2 SIDE VIEW - PARTIALLY BURIED PIPE
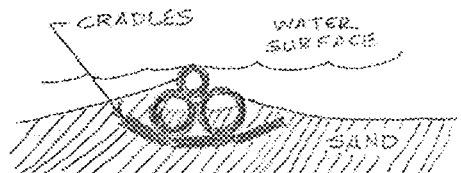
FIG. 3 SIDE VIEW - MULTIPLE PIPES IN CRADLE
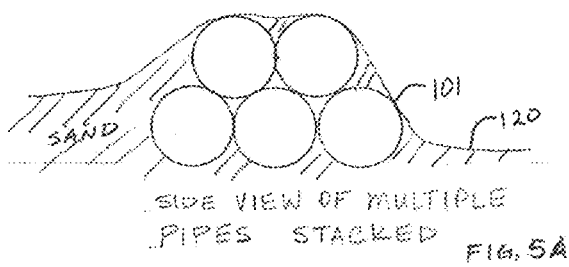
FIG. 5A SIDE VIEW OF MULTIPLE PIPES STACKED
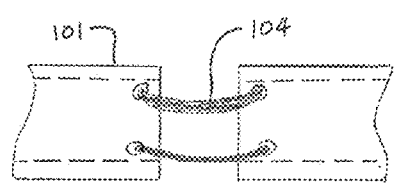
FIG. 4A PIPE END CONNECTED BY ROPE, CHAINS OR CABLES
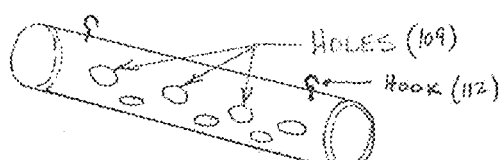
FIG. 5 PERSPECTIVE OF PIPE WITH SIDEWALL HOLES

PIPES IN CRADLE

SAND RETENTION SYSTEM

PRIORITY CLAIM

This application is a Non-Provisional U.S. Patent Application claiming benefit of U.S. Provisional Patent Application No. 61/871,223 filed Aug. 28, 2013, which is incorporated herein by reference in its entirety.

FIELD OF THE INVENTION

The present invention relates to building and maintaining stable sand beach or other riparian soil profiles along shorelines of oceans, seas, gulfs, lakes, rivers or streams and, more specifically, to a system and method that uses a series of plastic pipes, of varying composition, thickness and flexibility, strung together and placed along the bottom from the existing shore to a point underwater and offshore. The pipe-string structures are intended to slow down sand-carrying bottom currents such that erosion is inhibited and sand accretion is promoted and/or stabilized.

PRIOR ART AND BACKGROUND OF THE INVENTION

Coastal beach erosion is defined by actual removal of sand or other soil from a beach and depositing it offshore, inland or along tidal bays or estuaries. Such erosion can result from normal tidal action, severe wave action arising from storms and hurricanes, and from simple inundation due to rising water levels. The capacity of a Newtonian fluid, such as water, to carry solids is dependent upon the velocity and the density of the fluid. The density of water is related to the composition and amount of dissolved solids. Seawater for example will have salt and other solid particles carried in suspension. The size of suspended particles can range from microscopic to sand grains and on up to parts of sea shells and other organic matter.

The primary mechanisms responsible for erosion or accretion of sand/sediment are bottom currents flowing within a few inches up to as much as a foot or more above the shore bottom. These bottom currents act on the sand or sediment in a way that depends on the velocity of the currents and the force of the water against the sand, sediment or rocks situated along the shore. The bottom features (such as slope, smoothness, and undulations) affect the degree of packing of the sediment and thus has a large effect on the ability of current flow to erode or deposit sediment onto the bottom.

Water currents are produced by wind, tidal action, and variations in temperature, salinity or turbidity. Man-made coastal inlet, in particular ones that have hardened and have dredged channels tend to shunt inland or estuary water offshore. When this outflow of fresh and brackish water from land and estuaries combines with tidal flows into and out of the estuaries and bays into the gulfs or seas, it can cause instability in the water flow along the near-shore on both sides of inlets that can extend for great distances along the coast line.

If the predominant flow of water is outward from the coastal inlets this action will pull or suction water along the coastline and into the channel flow of an inlet. Gravitational effects causing current oscillations in and out of the inlets will increase the flow of water parallel to the shoreline. Bottom currents, generated by this flow of water to the inlets, are generated further offshore and typically run parallel to the shoreline between the beach and an offshore sandbar. These offshore, long-shore currents differ from classical near long-shore currents, normally identified as littoral currents that carry sand into the shore at an angle (depending upon the wind), but also carry sand out, perpendicular to the shoreline. These near-shore long-shore currents can be very strong and fast. They can move sand along the beach at several miles per hour. Wind-generated waves will also cause erosion or accretion of sand onto the beach or near-shore environments. Long-shore currents are one of the principal factors for the movement of sand into, along or from the beach and near-shore areas. To differentiate these two currents that act parallel to the shore line, we will stick to the term of "near-long-shore" currents that are near shore, normally very visible on the beach and refer to "offshore-long-shore currents" that are generated by inlets, currents which are present a distance from the beach, between the beach and an offshore sand bar.

The most common and well-known method for beach restoration is depositing sand dredged from a nearby offshore location. Less often, sand can also be excavated onshore and hauled overland to the point where it is deposited onto the beach, (see: Method of building or restoring marshes and beaches U.S. Pat. No. 4,759,664 and others). This restoration method was designed not only to build up beach sand, but also to construct a shallow-slope profile away from the beach to a point as far offshore as possible. An advantage of having a shallow-slope beach profile is that the wave energy and erosional power, particular storm event waves, are dissipated resulting in less beach erosion. However, this method of beach restoration has proven to be somewhat temporary and very costly. It can also be harmful to the environment by having a negative effect on the benthonic life on the bottom. In many places it has been effective for only a short period of time which requires it to be repeated periodically and especially after a major storm event.

Some of the more common and well-known methods of beach erosion control are barrier walls, concrete riprap, and concrete revetments. These structures are normally installed parallel to the beach. Despite being unnatural and eyesores, such structures have been successful in preserving or protecting property on the landside of the structure, however, they often accelerate the beach sand erosion process due to the fact that the full force of the incoming wave energy is not dissipated, particularly storm waves. The velocity of water energy contained in the wave does not allow time for the sand to drop out under the force of gravity and accrete on the beach. These structures can also have a negative impact by causing erosion on adjacent beaches. Construction permits for such structures are difficult to obtain where they may impact sea turtle nesting grounds.

Other erosion control devices include "groins." These structures normally extend into the water and perpendicular from the beach and are designed for high frequency, low magnitude storms. Many times they are used in tandem with seawalls. Groin structures are anchored into or lie on the seabed and can extend considerable distances into the water. They can be submerged or their tops can appear above the water surface. Structures in this category include T-groins, permeable groins, Longard Tubes (geo-tubes), jetties, seawalls, and bulkheads. These devices are designed to trap sand on the upside of the direction of the current while diverting the entire water column, current energy and excess sand to deeper water further offshore. In other words, sand is accreted on the upside beaches, and downside beaches become deprived of their sand supply. To be effective multiple groins must be placed along the entire shoreline at intervals of several hundred feet. The accretion process must be jump-started by filling in the front of each structure with sand. The disadvantage of groins is they are unnatural eyesores, they can be dangerous to surfers and swimmers and they can have a negative impact on turtles and other sea life. Plastic mesh groins are not durable and can be subject to vandalism.

Geosynthetic textile tubes can be made out of a variety of specialized, strong, UV and water-resistant synthetic fabrics. The material can be one tube or a series of tubes with different diameters sewn together. The tubes can be filled with sand or concrete once placed on the sea bed. Geo-textile tubes are disadvantageous because they are often expensive eyesores that are time consuming and difficult to install. They are subject to breakage and vandalism. Using sand fill involves dredging from a nearby source or truck-hauling to the fill site. Using concrete fill makes the geo-textile tubes more durable, but also rigid, permanent fixtures that become very expensive to remove if they did not work. Being rigid structures they may break during high magnitude storm events and thus less effective and may become an environmental hazard.

BRIEF SUMMARY OF THE INVENTION

Keeping in mind that only the bottom currents are responsible for erosion or accretion, it stands to reason that if these currents could be slowed down then sand particles can fall out of suspension by gravitation and accrete to the bottom. This invention is designed to slow down the bottom currents that flow near or offshore, either parallel and/or at different angles to a beach or shoreline. By simply slowing down and diverting the bottom sand-laden currents, the sand will drop out of solution through the force of gravity. This is a natural process whereby gravity does all the work.

While the concept of slowing down the near-bottom, sand-carrying current may be similar to the geo-textile tubes, this invention is unique and different because its design, selection of materials, durability, cost, and process of installation has little or no effect on the ecology of the bottom-dwelling animal and plant life. It is safe to swimmers, surfers and boaters. Its flexibility makes it easy to move or remove and/or add onto. It enables nature to constantly build up a beach and the beach slope profile.

The invention uses man-made synthetic, normally plastic-type pipes, with varying flexibility and thickness, which are strung together to form parallel pipe bundles (101). Equally important, the plastic pipe (101) composition will be extremely durable. These pipes are normally (but not limited to) those used to transport sewage and raw water. Such pipes are mass-produced and are relatively inexpensive. They are available in a wide variety of compositions, as well as, various lengths, diameters and colors. A distinct feature of this invention is that the pipe strings (101) become self-filling through large holes (109) drilled into them before positioning on the bottom. By constant wave action, sand (120) quickly fills the interior space. Some sections of the pipe strings (101) can be left unfilled with no holes (109) drilled and sealed at certain sections to provide buoyancy, if required.

The pipe strings (101) can be strung together for any desired length. The means of joining can be done by any readily available technology, such as ropes (113), twisted metal wire cables (114), metal or synthetic chains (115), and nylon straps (104). The pipes can be laid out onto the near shore bottom sediment (120) by conventional means as a single length from the shore to far offshore. Alternatively, they can be placed in parallel strands of varying diameters. The final design decisions as to distance from the foreshore or beach to offshore and the angle and/or curvature of placement is to be decided by a coastal engineer and/or contractor. As another alternative, the pipe strings (101) can be placed in preinstalled cradles (107) and bound together by straps (104) or other means to provide additional stability. (See FIGS. 3 and 6).

In another embodiment, the pipe strings (101) can be buried into the beach sand (120) and extend to above the high-water mark or into beach dunes or bluffs in order to hide the pipes and add stability to the design. Another important aspect to effectiveness is the pipe strings (101) are installed at a shallow depth in the seafloor (103). (See FIG. 2). The typical elevation of the pipes can range from a few inches up to any height above the seafloor (103). Pipes within the line of parallel strings (101) can have a different diameter and/or be laid in a pyramid arrangement. (See FIG. 3). The pipe strings (101) should not divert water flow but simply act as a speed bump to slow down the bottom currents. Sand (120) is deposited by the natural force of gravity both in front of and behind the pipe strings (101). The system of one or more pipes (101) acts as a seed by which a low profile, delta-like platform, grows. The pipe strings (101) soon become filled and covered by sand (110) and the profile continues to build until equilibrium is established.

The present invention overcomes many of the disadvantages of the prior art by providing flexible mat (106) composed of, but not limited to, used carpet material, (preferably synthetic), plastic fabric or woven polypropylene. The mats (106) are laid under the pipe strings (101). Ballast materials, either synthetic or natural (e.g., logs) can be laid underneath and perpendicular to the pipe strings (101) as a way to reduce premature sinking into the seafloor (103) and to ensure the elevation of the pipe string (101) is held and the desired profile is maintained. Some portions of the pipe string (101) can be sealed (air tight) to provide buoyancy to the system along all or a portion of their length.

The proper and effective positioning and "anchoring" of the pipes (101) onto the seafloor (103) is an important consideration due to the force of bottom currents, as well as, the fact that the pipes (101) are of low specific gravity, especially if air is entrained in them. There are several means by which stable anchoring can be accomplished, and the following are (but not limited to) examples;

a) Cradles (107) in which the pipes (101) are laid. See FIGS. 2 and 6.
b) Pilings (111) made of material selected from the group comprising wood, concrete, or plastic pipe, and filed with sand or concrete and situated perpendicular to the seafloor (103). See FIG. 7.

With both the above-mentioned methods of anchoring and positioning of the system of pipes (101), there is the advantage that the system can be removed and/or moved to another location if it is found to be ineffective.

Another major advantage, and one of the most important aspects of the uniqueness of this invention, is that once the pipes (101) become filled covered with the accretion of sand (110), additional pipes can be laid on top within the confines of the pilings (111) and/or cradles (107). This allows for continued accretion of sand (110) and results in continued building of the near-to offshore seafloor (103) profile. See FIG. 6.

In another embodiment, pilings (111) and/or cradles (107) are designed and constructed with additional capacity and built high enough, or designed such that additional piles (111) or vertical joints can be inserted at a later date, then additional pipes (101) can be laid within the confines of the structures, allowing for higher elevations of the seafloor (103) or custom-designing the profile of the beach as it extends offshore. See FIG. 7.

In yet another embodiment, the system can be modified to allow for additional build-up of beach sand (120) by stacking parallel pipes (101). For example, pipes (101) can be stacked in a triangular or pyramid shape (see FIG. 3). In this case, parallel of varying or consistent diameters pipes (101) may be connected and placed on top of existing, buried pipes (101) thus prompting additional buildup of surrounding sand (120).

Another innovation to this unique invention is that before stringing together the pipes and placing them on the sea bottom, small to large holes can be drilled into each pipe at a multitude of locations along the length of each pipe. These holes will allow the pipes (101) to become filled with water as they are being laid on the seafloor (103) and within a short period of time they will become self-filled with sand (110), thus eliminating any buoyancy, sinking them, and stabilizing them within the confines of the piles (111) or cradles (107). This eliminates the extra cost and logistical problem of filling the pipes (101) with sand (110) or concrete (108) after placement as experienced with some prior art. Refer to the holes (109) in the pipes (101) in FIG. 4.

Furthermore, this invention is unique in that a "lifting" system can be incorporated into the design; such as hooks (112), ropes (113), or durable wires (114) etc., that would allow any portion to be lifted and removed if the system (101) is not positioned correctly and/or becomes ineffective.

These and other improvements will become apparent when the following detailed disclosure is read in light of the supplied drawings. This summary is not intended to limit the scope of the invention to any particular described embodiment or feature. It is merely intended to briefly explain some of the key features in order to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein:

FIG. 1 is a sketch depicting a top view of pipes (101) joined end to end and extending from the beach (105) into water (102) and sand deposits (120) due to wave front action;

FIG. 2 is a sketch depicting an end view of a pipe stack (101) for the present invention partially buried in sand (120);

FIG. 3 is a sketch depicting an end view of partially buried pipe stack (101) secured with a strap (104) in a pyramid arrangement;

FIG. 4A is a sketch depicting a side view of pipes (101) with connection means such as straps (104) threaded through holes placed in the opposing ends of pipes (101);

FIG. 5 is a sketch depicting an end view of a pipe (101) with hooks (112) used in the present invention;

FIG. 5A is a sketch depicting a side view of the present invention with an alternative stacking configuration;

Figure 4:
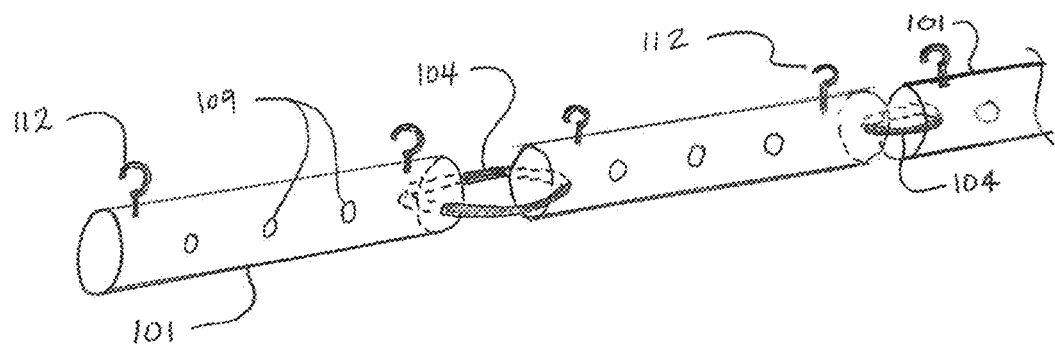
FIG. 4 is a sketch depicting a side view of pipes (101) with holes (109) and hooks (112) and connected with rope (113), durable wires (114), or chains (115)

The above figures are provided for the purpose of illustration and description only, and are not intended to define the limits of the disclosed invention. Use of the same reference number in multiple figures is intended to designate the same or similar parts. Furthermore, when the terms "top;" "bottom;" "first;" "second;" "upper;" "lower;" "height;" "width;" "length;" "end;" "side;" "horizontal;" "vertical;" and similar terms are used herein, if at all, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

The invention uses man-made synthetic, normally plastic-type pipes (101) with varying flexibility depending on composition and thickness of the pipe (101). The plastic pipe (101) composition is chosen by the coastal engineering professional for durability and ability to withstand the corrosive effects of seawater (102). The pipes (101) used in the design shall have various lengths, diameters and colors as necessary to achieve the design intent. These pipes (101) are to be self-filling by means of large holes (109) drilled into them before positioning on the seafloor (103) to allow sand to fill the interior space and provide ballast. Some sections of the tubes can be left unfilled with no holes (109) drilled and sealed at certain sections to provide buoyancy, if required.

The pipes (101) used in the invention are strung together for the length necessary to achieve the coastal engineering professional's design intent. The means of joining shall be by steel cable, chain, woven, plastic rope or other durable means sufficient to withstand the corrosive effects of freshwater or seawater (102). The pipes (101) can be laid out onto the sea seafloor (103) by conventional means as a single length from onshore to far offshore. Alternatively, they can be placed in parallel strands of varying diameters. The final design decisions as to distance from the foreshore or beach to offshore and the angle and/or curvature of placement is to be decided by a coastal engineer and/or contractor.

Figure 6:
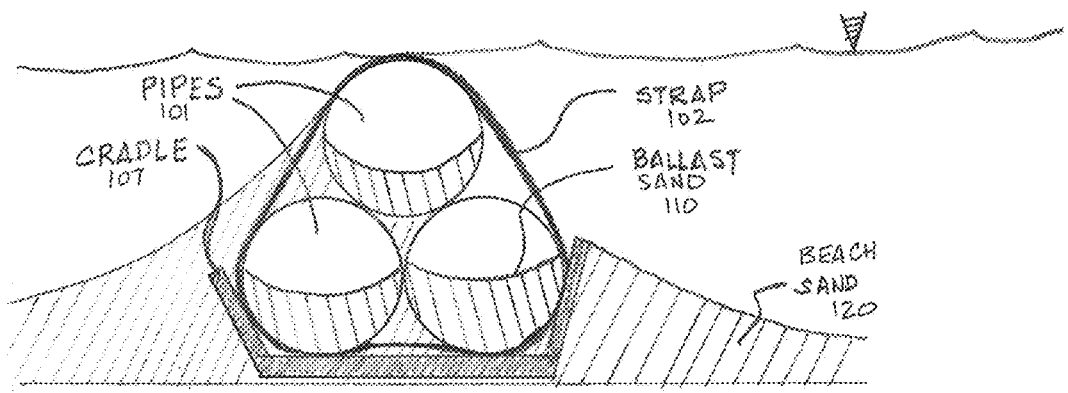
FIG. 6 is a sketch depicting an end view of pipes (101) secured with straps (104) and held in place by a cradle (107), partially covered with sand (120) and containing ballast sand (110)

In another embodiment, the pipes (101) can be placed in preinstalled cradles (107) and held by straps (104) to provide additional stability. See FIGS. 3 and 6. The pipes (101) or series of pipes (101) are to be buried into the dry beach sand (120) above the high-water mark or into the highest geographic feature of the beach in order to hide and stabilize the pipe string. The typical elevation of the pipes (101) can range from a few inches up to any height above the seafloor (103). Pipes (101) aligned parallel can have a different diameter and/or be laid in a pyramid arrangement. The present invention should not divert water flow but simply act as a speed bump to slow down the seafloor (103) currents. Sand (120) is deposited by the natural force of gravity both in front of and behind the pipes (101). The system of one or more pipes (101) acts as a seed by which a low profile, delta-like platform, grows. The pipes (101) soon become filled and covered by sand (120) and the profile continues to build until equilibrium is established.

In another embodiment, the pipe strings (101) are laid in preinstalled flat mats (106) composed of, but not limited to, used carpet material, (preferably synthetic), plastic fabric or woven polypropylene. The pipes (101) are laid on top of the mats (106). Ballast materials, either synthetic or natural (e.g., logs) can be laid underneath and perpendicular to the pipes (101) as a way to reduce premature sinking of the pipes (101) into the soft seafloor (103) and to ensure the elevation of the pipes (101) is held and the desired profile is maintained. Some portions of the pipes (101) can be sealed (air tight) so that they act as a floatation device for all or a portion of the length of the pipe.

Figure 7:
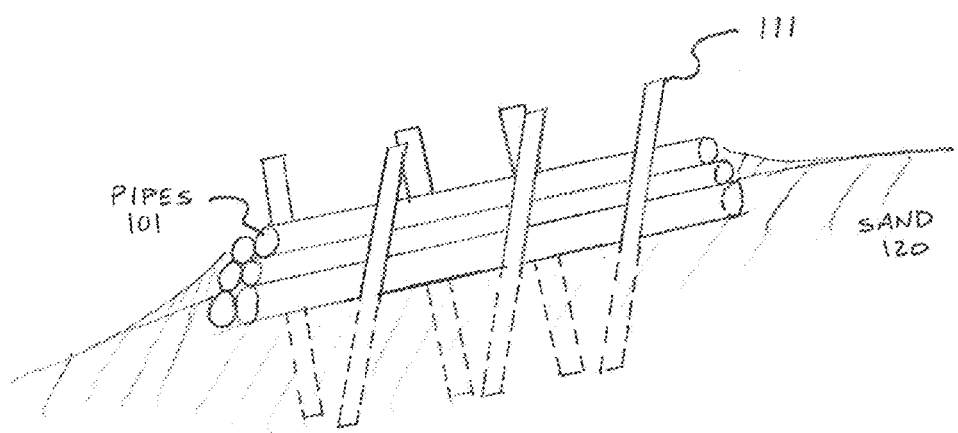
FIG. 7 is a sketch depicting the use of pilings (111) to hold the pipes (101) in place.

The pipe strings (101) are positioned and "anchored" onto the seafloor (120). There are several methods by which stable anchoring can be accomplished, and the following are (but not limited to) examples:
 a) Pilings (111) made of wood, concrete, or synthetic pipe (filed with sand (110) or concrete) perpendicular to the sea floor. See FIG. 7.
 b) Cradles (107) in which the pipe strings (101) are laid. See FIG. 6.

With both the above-mentioned methods of anchoring and positioning of the pipes (101), there is the advantage that the system can be removed and/or moved to another location if it is found to be ineffective.

One of the most important aspects of the invention is that once the pipes (101) become filled covered with the accretion of sand (120); additional pipes (101) can be laid on top within the confines of the pilings (111) and/or cradles (107). This allows for continued accretion of sand (120) and results in continued building of the near-to-offshore seafloor (103) slope profile. See FIG. 4.

In another embodiment, piles (111) and/or cradles (107) are designed and constructed with additional capacity and built high enough, or designed such that additional piles (111) or vertical joints can be inserted at a later date, then additional pipes (101) can be laid within the confines of the structures, allowing for higher elevations of the seafloor (103) or custom-designing the profile of the beach as it extends offshore. See FIG. 7.

Figure 5B:
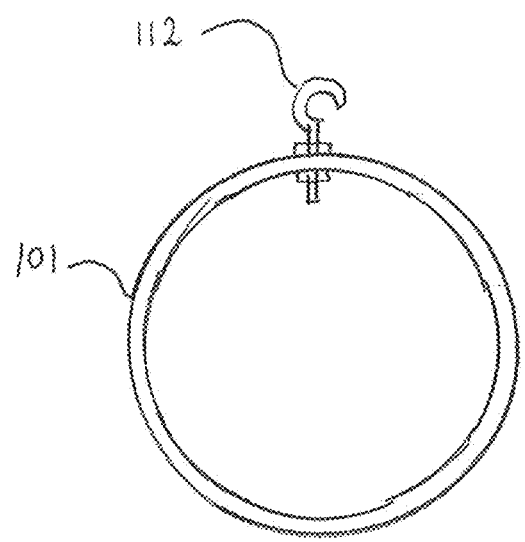
FIG. 5B is a sketch depicting an end view of the present invention with a lifting hook (112) attached.

In yet another embodiment, the system can be modified to allow for additional build-up of beach sand (120) by stacking parallel pipes (101). For example, pipes (101) can be stacked in a triangular or pyramid shape. In this case, parallel of varying or consistent diameters pipes (101) may be connected and placed on top of existing, buried pipes (101) thus prompting additional buildup of surrounding sand (120). See FIGS. 3, 5A, and 6.

Another innovation to this invention is that small to large holes are drilled into each pipe at a multitude of locations along the length of the each pipe before stringing together the pipes (101) and placing them on the seafloor (103). These holes will allow the pipes (101) to self-fill with water as they are being laid on the seafloor (103) and within a short period of time they will become self-filled with sand (120), thus providing ballast to sink and stabilize them within the confines of the piles (111) or cradles (107). This eliminates the extra cost and logistical problem of filling the pipes (101) with sand (120) or concrete after placement as experienced with the prior art such as geo-textile tubes. See FIGS. 5 and 5B.

In another embodiment, a "lifting" system is incorporated into the design; such as hooks (112), ropes (113), or durable wires (114), etc., that would allow any portion to be lifted and removed if the system is not positioned correctly and/or becomes ineffective. See FIG. 5.

These and other improvements will become apparent when the following detailed disclosure is read in light of the supplied drawings. This summary is not intended to limit the scope of the invention to any particular described embodiment or feature. It is merely intended to briefly explain some of the key features in order to allow a reader to quickly ascertain the subject matter of this disclosure. The scope of the invention is defined solely by the claims when read in light of the detailed disclosure.

While specific examples of the beach building system structures were described and shown, the invention may be embodied in other specific forms without departing from the spirit or essential characteristics thereof. For example, the structures depicted may be modified as necessary to accommodate the variations in the near-shore profiles as the coastal engineering professional deems suitable. The present embodiments are therefore to be considered in all respects as illustrative and not restrictive or otherwise limiting. Accordingly, the scope of the invention is established by the appended claims rather than by the foregoing description. All changes which come within the meaning and range of equivalency of the claims are therefore intended to be embraced therein.

The recitation of method steps does not necessarily denote a particular sequence for execution of the steps. Such method steps may therefore be performed in a sequence other than that recited—or even concurrently—unless the particular claim expressly states otherwise.

I claim:

1. A sand retention system for underwater installation along the near-shore profile of a body of water having a multiplicity of connected members comprising:
    a series of synthetic tubular members interconnected to lie parallel or on top of each other on the seafloor of the body of water and perpendicular to the shore line,
    the tubular members having holes of various sizes drilled in the sidewalls adapted to receive self-filling sand accumulation into the interior,
    the tubular members having connection means to hold the tubular members together end-to-end or in parallel groups to help stabilize the tubular members on the sea bottom,
    the tubular members being of varying diameters to accommodate efficient arrangement to achieve sand accumulation adjacent to the members,
    the tubular members having a lifting system incorporated in their design, the lifting system being selected from the group comprising hooks, ropes, turnbuckles, straps or woven wires of sufficient strength to support said tubular members in lifting tension;
    wherein said tubular members are connected end-to-end in a single strand or in bundles or multiple, parallel members, with cable connection means and laid out in pre-installed cradle means on the bottom of the water at an angle or perpendicular to the shore from a point on the shore to a point offshore.

2. The sand retention system as defined in claim 1 wherein said tubular members are connected end-to-end with cable connection means in a single strand and laid out on the bottom of the body of water perpendicular to the shore from a point on the shore to a point offshore.

3. The sand retention system as defined in claim 1 wherein said tubular members are connected end-to-end with cable connection means in a single strand and laid out on the bottom of the body of water at an angle to the shore from a point on the shore to a point offshore.

4. The sand retention system as defined in claim 1 wherein said tubular members are connected end-to-end in a single strand or in bundles of multiple, parallel members, with cable connection means and laid out in preinstalled cradle means on the bottom of the body of water at an angle or perpendicular to the shore from a point on the shore to a point offshore and buried into a geographic structure on the beach above the high-water mark so as to hide the tubular members and add stability to the dry land-based end.

5. The sand retention system of claim 1, wherein the tubular members are constructed of plastic pipe material selected from the group comprising polyethylene, polypropylene, polyvinylchloride or polystyrene.

6. The sand retention system as defined in claim 1 wherein said tubular members are laid out on flat mats on the bottom of the body of water wherein said mats are selected from the group comprising used carpet material, plastic material or woven polypropylene.

7. The sand retention system as defined in claim 1 wherein certain selected lengths of said tubular members are connected end-to-end and in bundles of multiple, parallel members, with cable connection means and are sealed air-tight by sealing means to allow said certain selected lengths to act as floatation devices for all or a portion of the length of tubular members.

8. The sand retention system as defined in claim 1 wherein said tubular members are secured to the dry land shore end by anchoring means and to the underwater termination end by anchoring means on the bottom of the body of water at a point offshore.

9. The sand retention system as defined in claim 8 wherein said anchoring means is straps surrounding stacked pipes and placed in rigid or non-rigid cradles.

10. The sand retention system as defined in claim 8 wherein said anchoring means is selected from the group comprising piling made of wood, concrete or sand-filled synthetic pipe.

11. A sand retention system for underwater installation along the near-shore profile of a body of water having a multiplicity of connected members comprising:
a series of synthetic tubular members interconnected to lie parallel or on top of each other on the seafloor of the body of water and perpendicular to the shore line,
the tubular members having holes of various sizes drilled in the sidewalls adapted to receive self-filling sand accumulation into the interior,
the tubular members having connection means to hold the tubular members together end-to-end or in parallel groups to help stabilize the said tubular members on the sea bottom,
the tubular members being of varying diameters to accommodate efficient arrangement to achieve sand accumulation adjacent to the members,
the tubular members having a lifting system incorporated in their design, the lifting system being selected from the group comprising hooks, ropes, turnbuckles, straps or woven wires of sufficient strength to support said tubular members in lifting tension;
wherein said tubular members are laid out on flat mats on the bottom of the body of water wherein said mats are selected from the group comprising used carpet material, plastic material or woven polypropylene.

12. The sand retention system as defined in claim 11 wherein said tubular members are connected end-to-end with cable connection means in a single strand and laid out on the bottom of the body of water perpendicular to the shore from a point on the shore to a point offshore.

13. The sand retention system as defined in claim 11 wherein said tubular members are connected end-to-end with cable connection means in a single strand and laid out on the bottom of the body of water at an angle to the shore from a point on the shore to a point offshore.

14. The sand retention system as defined in claim 11 wherein said tubular members are connected end-to-end in a single strand or in bundles of multiple, parallel members, with cable connection means and laid out in preinstalled cradle means on the bottom of the body of water at an angle or perpendicular to the shore from a point on the shore to a point offshore.

15. The sand retention system as defined in claim 11 wherein said tubular members are connected end-to-end in a single strand or in bundles of multiple, parallel members, with cable connection means and laid out in preinstalled cradle means on the bottom of the body of water at an angle or perpendicular to the shore from a point on the shore to a point offshore and buried into a geographic structure on the beach above the high-water mark so as to hide the tubular members and add stability to the dry land-based end.

16. The sand retention system of claim 11, wherein the tubular members are constructed of plastic pipe material selected from the group comprising polyethylene, polypropylene, polyvinylchloride or polystyrene.

17. The sand retention system as defined in claim 11 wherein certain selected lengths of said tubular members are connected end-to-end and in bundles of multiple, parallel members, with cable connection means and are sealed airtight by sealing means to allow said certain selected lengths to act as floatation devices for all or a portion of the length of tubular members.

18. The sand retention system as defined in claim 11 wherein said tubular members are secured to the dry land shore end by anchoring means and to the underwater termination end by anchoring means on the bottom of the body of water at a point offshore.

19. The sand retention system as defined in claim 18 wherein said anchoring means is straps surrounding stacked pipes and placed in rigid or non-rigid cradles.

20. The sand retention system as defined in claim 18 wherein said anchoring means is selected from the group comprising piling made of wood, concrete or sand-filled synthetic pipe.

21. A sand retention system for underwater installation along the near-shore profile of a body of water having a multiplicity of connected members comprising:
a series of synthetic tubular members interconnected to lie parallel or on top of each other on the seafloor of the body of water and perpendicular to the shore line,
the tubular members having holes of various sizes drilled in the sidewalls adapted to receive self-filling sand accumulation into the interior,
the tubular members having connection means to hold the tubular members together end-to-end or in parallel groups to help stabilize the tubular members on the sea bottom,
the tubular members being of varying diameters to accommodate efficient arrangement to achieve sand accumulation adjacent to the members,
the tubular members having a lifting system incorporated in their design, the lifting system being selected from the group comprising hooks, ropes, turnbuckles, straps or woven wires of sufficient strength to support said tubular members in lifting tension;

wherein certain selected lengths of said tubular members are connected end-to-end and in bundles of multiple, parallel members, with cable connection means and are sealed air-tight by sealing means to allow said certain selected lengths to act as floatation devices for all or a portion of the length of tubular members.

22. The sand retention system as defined in claim 21 wherein said tubular members are connected end-to-end with cable connection means in a single strand and laid out on the bottom of the body of water perpendicular to the shore from a point on the shore to a point offshore.

23. The sand retention system as defined in claim 21 wherein said tubular members are connected end-to-end with cable connection means in a single strand and laid out on the bottom of the body of water at an angle to the shore from a point on the shore to a point offshore.

24. The sand retention system as defined in claim 21 wherein said tubular members are connected end-to-end in a single strand or in bundles of multiple, parallel members, with cable connection means and laid out in preinstalled cradle means on the bottom of the body of water at an angle or perpendicular to the shore from a point on the shore to a point offshore.

25. The sand retention system as defined in claim 21 wherein said tubular members are connected end-to-end in a single strand or in bundles of multiple, parallel members, with cable connection means and laid out in preinstalled cradle means on the bottom of the body of water at an angle or perpendicular to the shore from a point on the shore to a point offshore and buried into a geographic structure on the beach above the high-water mark so as to hide the tubular members and add stability to the dry land-based end.

26. The sand retention system of claim 21, wherein the tubular members are constructed of plastic pipe material selected from the group comprising polyethylene, polypropylene, polyvinylchloride or polystyrene.

27. The sand retention system as defined in claim 21 wherein said tubular members are laid out on flat mats on the bottom of the body of water wherein said mats are selected from the group comprising used carpet material, plastic material or woven polypropylene.

28. The sand retention system as defined in claim 21 wherein said tubular members are secured to the dry land shore end by anchoring means and to the underwater termination end by anchoring means on the bottom of the body of water at a point offshore.

29. The sand retention system as defined in claim 28 wherein said anchoring means is straps surrounding stacked pipes and placed in rigid or non-rigid cradles.

30. The sand retention system as defined in claim 28 wherein said anchoring means is selected from the group comprising piling made of wood, concrete or sand-filled synthetic pipe.

31. A sand retention system for underwater installation along the near-shore profile of a body of water having a multiplicity of connected members comprising:
- a series of synthetic tubular members interconnected to lie parallel or on top of each other on the seafloor of the body of water and perpendicular to the shore line,
- the tubular members having holes of various sizes drilled in the sidewalls adapted to receive self-filling sand accumulation into the interior,
- the tubular members having connection means to hold the tubular members together end-to-end or in parallel groups to help stabilize the tubular members on the sea bottom,
- the tubular members being of varying diameters to accommodate efficient arrangement to achieve sand accumulation adjacent to the members,
- the tubular members having a lifting system incorporated in their design, the lifting system being selected from the group comprising hooks, ropes, turnbuckles, straps or woven wires of sufficient strength to support said tubular members in lifting tension;
- wherein said tubular members are secured to the dry land shore end by anchoring means and to the underwater termination end by anchoring means on the bottom of the body of water at a point offshore; and
- said anchoring means is straps surrounding stacked pipes and placed in rigid or non-rigid cradles.

32. The sand retention system as defined in claim 31, wherein said tubular members are connected end-to-end with cable connection means in a single strand and laid out on the bottom of the body of water perpendicular to the shore from a point on the shore to a point offshore.

33. The sand retention system as defined in claim 31, wherein said tubular members are connected end-to-end with cable connection means in a single strand and laid out on the bottom of the body of water at an angle to the shore from a point on the shore to a point offshore.

34. The sand retention system as defined in claim 31, wherein said tubular members are connected end-to-end in a single strand or in bundles of multiple, parallel members, with cable connection means and laid out in preinstalled cradle means on the bottom of the body of water at an angle or perpendicular to the shore from a point on the shore to a point offshore.

35. The sand retention system as defined in claim 31, wherein said tubular members are connected end-to-end in a single strand or in bundles of multiple, parallel members, with cable connection means and laid out in preinstalled cradle means on the bottom of the body of water at an angle or perpendicular to the shore from a point on the shore to a point offshore and buried into a geographic structure on the beach above the high-water mark so as to hide the tubular members and add stability to the dry land-based end.

36. The sand retention system of claim 31, wherein the tubular members are constructed of plastic pipe material selected from the group comprising polyethylene, polypropylene, polyvinylchloride or polystyrene.

37. The sand retention system as defined in claim 31, wherein said tubular members are laid out on flat mats on the bottom of the body of water wherein said mats are selected from the group comprising used carpet material, plastic material or woven polypropylene.

38. The sand retention system as defined in claim 31, wherein certain selected lengths of said tubular members are connected end-to-end and in bundles of multiple, parallel members, with cable connection means and are sealed airtight by sealing means to allow said certain selected lengths to act as floatation devices for all or a portion of the length of tubular members.

39. The sand retention system as defined in claim 31, wherein said anchoring means is selected from the group comprising piling made of wood, concrete or sand-filled synthetic pipe.

* * * * *